United States Patent [19]

Deets et al.

[11] 4,405,753

[45] Sep. 20, 1983

[54] POLYBLENDS

[75] Inventors: Gary L. Deets; Quiriano A. Trementozzi, both of Springfield, Mass.

[73] Assignee: Monsanto Company, St. Louis, Mo.

[21] Appl. No.: 345,286

[22] Filed: Feb. 3, 1982

[51] Int. Cl.$^3$ ............................................. C08L 61/04
[52] U.S. Cl. ...................................... 525/68; 525/74; 525/905
[58] Field of Search .................... 525/68, 905, 69

[56] References Cited

U.S. PATENT DOCUMENTS 4,234,701  11/1980  Abolins et al. ................... 525/68

FOREIGN PATENT DOCUMENTS 2005693A  4/1979  United Kingdom .............. 525/68
1562540  3/1980  United Kingdom .............. 525/68

*Primary Examiner*—J. Ziegler
*Attorney, Agent, or Firm*—Michael J. Murphy

[57] ABSTRACT

Polyblends are described which comprise (i) 40 to 60% by weight of polyphenylene oxide; (ii) from 10 to 30% by weight an SAN or ABS polymer comprising from 2 to 14% by weight of acrylonitrile; and (iii) from 10 to 30% by weight of a styrene/maleic anhydride copolymer containing from 5 to 18% by weight of maleic anhydride; and in which: (a) the weight proportion of rubber (ungrafted basis) in the polyblend is less than 8%; and (b) the proportions of acrylonitrile and maleic anhydride are selected such that, when plasticized only with 4 parts of triphenyl phosphate for each 100 parts by weight of polyphenylene oxide, the Izod impact strength is at least 50 J/M notch and the distortion temperature under load is at least 110° C.

4 Claims, No Drawings

POLYBLENDS

BACKGROUND OF THE INVENTION

This invention relates to polyblends and specifically to polyblends of polyphenylene oxide with (optionally rubber modified) styrene/acrylonitrile copolymers and styrene/maleic anhydride copolymers. These polyblends are particularly useful as they combine excellent impact strength and heat distortion temperature.

DISCUSSION OF THE PRIOR ART

Blends of polyphenylene oxide with styrenic polymers are broadly described in U.S. Pat. No. 3,383,435. The patent describes blends incorporating into a polyphenylene oxide one or more of homopolystyrene (PS), styrene/acrylonitrile/butadiene polymers (ABS), and rubber-modified (or high impact) polystyrene (HIPS).

In general, however, commercial interest has focussed on blends with HIPS because these prove to have physical characteristics that make them particularly suitable for the manufacture of molded parts. Blends with AN-containing polymers such as SAN and ABS have not in general been favored since compatibility problems have been encountered resulting in properties falling well below what might be expected or indeed commercially acceptable.

The present invention provides novel polyblends of polyphenylene oxide with specified styrenic polymers which have properties that unexpectedly far surpass what might be anticipated on the basis of the known art. The blends have excellent combinations of heat distortion temperature and impact strength and are most attractive for a wide variety of applications.

DESCRIPTION OF THE INVENTION

The present invention provides a polyblend comprising:
A. from 40 to 60% by weight of a polyphenylene oxide;
B. from 10 to 30% by weight of a polymer comprising from about 2 to 15% by weight of an unsaturated nitrile monomer, from 65 to 94% by weight of a vinyl aromatic monomer and from 0 to 20% by weight of a rubber having a glass transition temperature below 0° C.; and
C. from 10 to 30% by weight of a polymer comprising from 2 to 18% of an ethylenically unsaturated dicarboxylic acid anhydride, from 95 to 65% by weight of a vinylaromatic monomer and from 0 to 20% of a copolymerizable acrylate ester.

The compatibility limits of Components A and B are discussed in U.S. Application Ser. No. 322,803, filed Nov. 19, 1981. It has now been found, however, that polyblends of these components can be rendered useful even beyond the limits set in that application if a third polymer (Component C), containing an anhydride co-monomer is added provided that the percentage of anhydride in the polyblend does not exceed that of the nitrile. Additionally, while Components A and C have compatibilities limited by the percentage of the anhydride monomer, this range can be significantly extended by the presence of limited amounts of Component B. This surprising effect means that polyblends can be obtained in which the advantageous properties conveyed by the presence of larger amounts of nitrile and anhydride monomers can be obtained without suffering any significant compatibility problems. Likewise, Component B with a small proportion of nitrile can compatibilize blends of Components A and C which are incompatible as a result of an excessive proportion portion (above about 15%) of the anhydride monomer providing a balance is struck. As will be demonstrated in the Examples set forth below an amount of Component C comprising a small amount of the anhydride monomer compatibilizes normally incompatible (because of a nitrile content in B above about 9% by weight) blends of Components A and B.

Where Component B contains a rubber the polymer usually has two components: a matrix copolymer of the vinylaromatic and nitrile monomers and a dispersed phase comprising rubber particles, usually grafted with the matrix monomers in the ratio in which they appear in the matrix polymer. Such polymers belong to the family of ABS polymers and it is a preferred feature of this invention that Component B is an ABS polymer.

In the same way Component C can be rubber modified either by polymerizing the monomers in the presence of the rubber or by a post-blending operation.

The rubber component of Components B and C, where present, has a glass transition temperature below 0° C. and preferably below $-30°$ C. It may be provided by polymers comprising at least 60% of a diene monomer such as butadiene, isoprene chloroprene and the like with optional copolymerizable monomers such as vinylaromatic monomer or an unsaturated nitrile. Alternatively, other rubbers such as acrylate, EPDM and polypentenamer rubbers may be employed.

The vinylaromatic monomer in both Components B and C is usually styrene but this can be replaced in whole or in part by other related monomers such as α-methylstyrene, p-methylstyrene, chlorostyrene and other halostyrenes, o-ethylstyrene and the like. Styrene is, however, the preferred monomer and this is used in the following description, wherever the context permits, to represent the above group of vinylaromatic monomers.

The unsaturated nitrile monomer of Component B is preferably acrylonitrile but this too can be replaced in whole or in part by a related nitrile such as methacrylonitrile. However, this group will be represented in what follows, so far as context allows, by acrylonitrile.

The anhydride monomer of Component C can be maleic, aconitic, itaconic, or citraconic anhydride but maleic anhydride is the preferred representative of this group.

The acrylate ester can be a methacrylate or ethacrylate in addition to the acrylate and the esterifying group is usually derived from a $C_1$ to $C_3$ alcohol such as methyl, ethyl or isopropyl alcohol.

The polyphenylene oxide (Component A) is a self-condensation product of a monohydric monocyclic phenol conventionally produced by reacting the phenol with oxygen in the presence of a complex copper catalyst. In general, molecular weight can be controlled by catalyst concentration, solvent/non-solvent ratios, and reaction time, longer times providing a higher average number of repeating units.

A preferred family of polyphenylene oxides has repeating structural units of the formula:

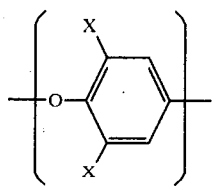

wherein the oxygen atom of one unit is connected to the benzene nucleus of the next adjoining unit, n is a positive integer and is at least 50, and each X is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl 1,4-phenylene)oxide; poly(2,6-diphenyl-1,4- phenylene)oxide; poly(2,6-dimethoxy-1,4-phenylene)oxide; poly(2,6-diethoxy-1,4-phenylene)oxide; poly(2-methoxy-6-ethoxy-1,4-phenylene)oxide; poly(2-ethyl-6-stearyloxy-1,4-phenylene) oxide; poly(2,6-dichloro-1,4-phenylene)oxide; poly(2-methyl-6-phenyl-1,4-phenylene)oxide; poly(2,6-di-benzyl -1,4-phenylene)oxide; poly(2-ethoxy-1,4-phenylene) oxide; poly(2-chloro-1,4-phenylene)oxide; poly(2,5-dibromo-1,4-phenylene)oxide; and the like. Also included under the heading of polyphenylene oxides are copolymers derived from condensation of mixed phenols such as 2,6-dimethyl phenol and 2,3,6-trimethyl phenol.

For purposes of the present invention as especially preferred family of polyphenylene ethers include those having alkyl substitution in the two positions ortho to the oxygen ether atom, i.e., those of the above formula wherein each X is alkyl, most preferably having from 1 to 4 carbon atoms. Illustrative members of this class are: poly(2,6-dimethyl-1,4-phenylene)oxide; poly(2,6-diethyl-1,4-phenylene)oxide; poly(2-methyl-6-ethyl-1,4-phenylene) oxide; poly( 2-methyl-6-propyl-1,4-phenylene)oxide; poly(2,6-dipropyl-1,4-phenylene)oxide; poly( 2-ethyl-6-propyl-1,4-phenylene)oxide; and the like.

The most preferred polyphenylene oxide resin for purposes of the present invention is poly(2,6-dimethyl-1,4-phenylene) oxide.

The polyblend of the invention comprises up to a total of 8% by weight (measured as ungrafted substrate) of the rubber which may be contributed by either or both of Components B and C or may be post-blended with both as desired. Preferably, the rubber content is from 2 to 7% by weight.

In addition to Components A, B and C the polyblend can comprise up to 40% by weight based on the combined weight of Components A, B and C of additional polymeric components conferring improved properties such as a block copolymer diene rubber or an acrylate/styrene/butadiene polymer (such as Acryloid XM-611 from Rohm and Haas) to improve impact strength. The polyblend can also include plasticizers and flow aids to improve processability; stabilizers and antioxidants to protect against polymer degradation; and fire retardants where required for the proposed end-use. It is especially preferred that the polyblend comprises certain phosphate esters capable of serving to improve melt flow and, at a high enough concentration, a degree of flame retardance. Typical of such esters are triaryl phosphates such as triphenyl phosphate and tricresylphosphate and alkenyl/aryl phosphates. Other known additives such as particulate or fibrous fillers, dyes, pigments, antistatic additives and the like can be added as required.

The advantages of the polyblends of the present invention over those of the prior art are more completely explained below. Generally, polyblends of the type described are useful in applications in which a product formed from the blend must have significant strength and must not become distorted on exposure to elevated temperatures. It is convenient then to define target polyblends by their ability to meet strength and distortion temperature criteria. The impact strength of a blend is strongly affected by the rubber content but this itself has a negative affect on heat distortion characteristics which is enhanced by maleic anhydride content and polyphenylene oxide content. The present invention provides blends in which these desirable properties are displayed simultaneously to give very advantageous formulations.

DESCRIPTION OF THE PREFERRED EMBODIMENTS

To illustrate the unexpected and advantageous properties obtained from the polyblends of the invention several ABS polymers were produced with varying amounts of acrylonitrile. In each case the amount of rubber was held essentially constant.

The ABS polymers were obtained by mass polymerization of styrene and acrylonitrile monomers in the presence of the rubber (a polybutadiene sold by Firestone Co., as Diene 35) under essentially similar conditions.

The SMA polymers were obtained by mass polymerization with staged addition of the maleic anhydride to give a polymer with a uniform composition. In some cases the polymerization was conducted in the presence of a diene rubber.

Each sample was then Brabender blended in the stated weight proportions with a commercial poly(2,6-dimethyl phenol).

Each blend was then tested for its Izod Impact Strength (using ASTM D-256) and Distortion Temperature Under Load, or DTUL, (using ASTM D-648) on compression molded samples. In addition, further samples of the same polymers were extrusion blended and injection molded samples thereof were tested for Izod Impact Strength and DTUL (using the same ASTM procedure); Tensile (Yield) (ASTM D-638) Tensile (Fail) (ASTM D-638); Percentage Elongation at Fail (ASTM D-638); and Tensile Modulus (ASTM D-638).

The polyblend formulations and their properties are set forth in Table 1 below.

TABLE I

| | C-1 | C-2 | C-3 | C-4 | C-5 | C-6 | I-1 | I-2 | I-3 | I-4 | I-5 | I-6 | I-7 | I-8 | I-9 |
|---|---|---|---|---|---|---|---|---|---|---|---|---|---|---|---|
| Formulation | | | | | | | | | | | | | | | |
| PPO[1] | 50 | 50 | 50 | 50 | 40 | 40 | 50 | 50 | 50 | 50 | 50 | 50 | 50 | 40 | 40 |
| ABS | 50 | 50 | 25 | 25 | — | — | 25 | 25 | 25 | 25 | 25 | 25 | 25 | 30 | 30 |

TABLE I-continued

|  | C-1 | C-2 | C-3 | C-4 | C-5 | C-6 | I-1 | I-2 | I-3 | I-4 | I-5 | I-6 | I-7 | I-8 | I-9 |
|---|---|---|---|---|---|---|---|---|---|---|---|---|---|---|---|
| % AN[2] | 9.4 | 12.2 | 9.4 | 12.2 | — | — | 9.4 | 9.4 | 12.2 | 12.2 | 7.5 | 7.5 | 7.5 | 7.5 | 7.5 |
| % Rubber[2] ABS | 12.6 | 12.6 | 12.6 | 12.6 | — | — | 12.6 | 12.6 | 12.6 | 12.6 | 12.6 | 12.6 | 12.6 | 12.6 | 12.6 |
| SMA | — | — | 25 | 25 | 60 | 60 | 25 | 25 | 25 | 25 | 25 | 25 | 25 | 30 | 30 |
| % MA[3] | — | — | 12.1 | 12.1 | 17.1 | 13.0 | 5.8 | 8.0 | 5.8 | 8.0 | 12.1 | 17.1 | 13.0 | 17.1 | 12.0 |
| % Rubber in SMA | — | — | 0 | 0 | 12.0 | 12.0 | 0 | 1.0 | 0 | 1.0 | 0 | 12.0 | 12.0 | 12.0 | 12.0 |
| % Rubber in Blend | 6.3 | 6.3 | 3.2 | 3.2 | 7.2 | 7.2 | 3.2 | 3.4 | 3.2 | 3.4 | 3.2 | 6.2 | 6.2 | 7.4 | 7.4 |
| Properties (on compression molded samples) Izod (joules/meter) | 37.8 | 27.0 | 38.0 | 27.1 | 48.6 | 86.4 | 81.3 | 92.2 | 54.2 | 54.2 | 91.8 | 102.6 | 183.6 | 167.4 | 194.4 |
| DTUL (°C.) | 94 | 90 | 109 | 105 | 132 | 121 | 123 | 124 | 128 | 130 | 117 | 127 | 117 | 123 | 118 |

[1] Poly (2.6-dimethyl phenol)condensation product (with 4 phr of triphenyl phosphate).
[2] Based on the ABS Polymer.
[3] Based on the SMA Polymer
$C_1$-$C_6$ comparative.
$I_1$-$I_9$ illustrate the invention.

As can be seen from the data presented on Table I, PPO/ABS blends with proportions of acrylonitrile in the ABS of 9.4 result in inferior products ($C_1$). However, the incorporation of an SMA with 5.8% of maleic anhydride ($I_1$) improves the Izod by over 215% even though the rubber content is almost halved. An SMA with 8.0% of maleic anhydride ($I_2$) provided an even greater boost but when the maleic anhydride content was raised to 12.1% ($C_3$) the limits of compatibility were exceeded and the Izod fell sharply.

Thus, an ABS with 9.4% acrylonitrile can be compatibilized using an SMA with up to about 10% maleic anhydride.

Likewise, by comparing $C_2$ with $I_3$ and $I_4$ it can be seen that an ABS with 12.2% of acrylonitrile can be compatibilized with PPO by using an SMA with 5.8% or 8.0% of maleic anhydride but that one containing 12.1% of anhydride ($C_4$) has a counter productive effect.

In similar fashion, comparison of $C_5$ with $I_8$ shows that although an SMA+PPO blend containing an SMA with 17.1% of maleic anhydride has poor impact properties, the incorporation of an ABS with 7.5% of acrylonitrile improves the impact strength by almost 350%.

It is, therefore, clear that the acrylonitrile and maleic anhydride contents have, over certain ranges, a distinct synergistic effect that permit the production of blends with a highly advantageous balance of properties.

The above Examples are for the purposes of illustration of the advantages of the invention and are not intended to imply any limitation on the essential scope thereof. It is foreseen that many minor variations, modifications and additions known in the art could be made without departing from the essential elements of the invention. It is intended that all such variations, modifications and additions be embraced within the purview of this invention.

What is claimed is:
1. A polyblend comprising:
   A. from 40 to 60% by weight of a polyphenylene oxide;
   B. from 10 to 30% by weight of a polymer comprising: from 2 to 15% by weight of an unsaturated nitrile monomer; from 65 to 94% by weight of a vinylaromatic monomer; and from 5 to 20% by weight of a rubber having a glass transition temperature below 0° C.; and
   C. from 10 to 30% by weight of a polymer comprising from 2 to 18% of an ethylenically unsaturated dicarboxylic acid anhydride, from 95 to 65% by weight of a vinylaromatic monomer, and from 0 to 12% by weight of a rubber having a glass transition temperature below 0° C.; in which
   (i) the weight proportion of rubber in the polyblend is less than 8%; and
   (ii) the proportions of the nitrile monomer and the anhydride monomer are selected such that, when plasticized only with four parts of triphenyl phosphate for each 100 parts by weight of Component A, the Izod impact strength of annealed compression molded samples of the polyblend measured according to ASTM Procedure D-256 is at least 50 joules/meter notch and the distortion temperature under load of similar samples measured according to ASTM Procedure D-648, is at least 110° C.

2. A polyblend according to claim 1 in which the polyphenylene oxide is a self-condensation polymer of 2,6-dimethylphenol.

3. A polyblend according to claim 1 in which the Component B is an acrylonitrile/butadiene/styrene copolymer.

4. A polyblend according to claim 1 in which Component C is a styrene/maleic anhydride copolymer.

* * * * *